(12) United States Patent
Fernandez et al.

(10) Patent No.: US 10,751,624 B2
(45) Date of Patent: Aug. 25, 2020

(54) METHOD AND APPARATUS FOR PROVIDING A COMPUTER IMPLEMENTED GAME

(71) Applicant: KING.COM LIMITED, St. Julians (MT)

(72) Inventors: Albert Fernandez, Barcelona (ES); Marc Pestka, Barcelona (ES)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 16/311,299

(22) PCT Filed: Jun. 23, 2017

(86) PCT No.: PCT/EP2017/065540
§ 371 (c)(1),
(2) Date: Dec. 19, 2018

(87) PCT Pub. No.: WO2017/220780
PCT Pub. Date: Dec. 28, 2017

(65) Prior Publication Data
US 2019/0232166 A1    Aug. 1, 2019

Related U.S. Application Data

(63) Continuation-in-part of application No. 15/191,081, filed on Jun. 23, 2016.

(51) Int. Cl.
*A63F 13/48* (2014.01)
*A63F 13/537* (2014.01)
*A63F 13/798* (2014.01)
*A63F 13/67* (2014.01)
*A63F 13/352* (2014.01)

(52) U.S. Cl.
CPC .......... *A63F 13/537* (2014.09); *A63F 13/352* (2014.09); *A63F 13/67* (2014.09); *A63F 13/798* (2014.09)

(58) Field of Classification Search
CPC .......... A63F 13/48; A63F 13/67; A63F 13/69; A63F 2300/6027; A63F 2300/636
See application file for complete search history.

(56) References Cited

U.S. PATENT DOCUMENTS

| 6,325,715 | B1* | 12/2001 | Nagata | A63F 13/005 |
| | | | | 463/5 |
| 2002/0188361 | A1* | 12/2002 | Chudley | A63F 13/12 |
| | | | | 700/92 |
| 2004/0002369 | A1* | 1/2004 | Walker | A63F 13/12 |
| | | | | 463/1 |
| 2006/0007795 | A1* | 1/2006 | David | H04N 21/42204 |
| | | | | 369/30.03 |

(Continued)

OTHER PUBLICATIONS

International Search Report, dated Jan. 9, 2017, and Written Opinion issued in International Application No. PCT/EP2017/065540.

*Primary Examiner* — Steven J Hylinski
(74) *Attorney, Agent, or Firm* — Saul Ewing Arnstein & Lehr LLP

(57) ABSTRACT

A user device provides a computer implemented game with different levels. The device has a user interface. A player selects a level via the user interface. When a level is selected, the associated game board in displayed. Information about the difficulty of at least one of the levels is displayed.

16 Claims, 14 Drawing Sheets

(56) References Cited

U.S. PATENT DOCUMENTS

| | | |
|---|---|---|
| 2010/0144444 A1 | 6/2010 | Graham |
| 2013/0029765 A1 | 1/2013 | Parks et al. |
| 2014/0080556 A1* | 3/2014 | Knutsson ................ G07F 17/32 463/7 |
| 2014/0235306 A1* | 8/2014 | Walls ...................... A63F 13/10 463/9 |
| 2014/0235338 A1* | 8/2014 | Hansson ................. G07F 17/32 463/31 |
| 2014/0364210 A1* | 12/2014 | Murray ............... G07F 17/3272 463/31 |
| 2014/0370950 A1* | 12/2014 | Hansson ............. A63F 13/2145 463/9 |
| 2015/0174488 A1* | 6/2015 | Dancau ................... A63F 13/57 463/9 |
| 2015/0174489 A1* | 6/2015 | Evald ...................... A63F 13/47 463/31 |
| 2015/0321099 A1* | 11/2015 | Knuttson ................ A63F 13/52 463/31 |
| 2016/0048286 A1* | 2/2016 | Picon .................... G06F 3/0488 463/33 |

\* cited by examiner

Figure 7

| Player ID | Game | Level number | Level result |
|---|---|---|---|
| 730 | 732 | 734 | 736 |

US 10,751,624 B2

METHOD AND APPARATUS FOR PROVIDING A COMPUTER IMPLEMENTED GAME

CROSS REFERENCE TO RELATED APPLICATIONS

This application claims the priority of PCT/EP2017/065540, filed on Jun. 23, 2017, which is a continuation-in-part of U.S. application Ser. No. 15/191,081, filed on Jun. 23, 2016, the entire contents of each of which is fully incorporated herein by reference.

FIELD

Embodiments of this application relate to a user device and a server for use in playing a computer implemented game.

Some embodiments may relate to engaging users or players in a computer game executable in an online environment.

BACKGROUND

There exist many types of computer device where the display is controlled by an input. In some embodiments the input may be a cursor or pointer that is controlled by a human interface device such as a mouse, joystick, keyboard etc. Additionally or alternatively the display may comprise a touchscreen which can be controlled by a user's touch. That is, activation of functions and objects is responsive to user input made by way of the user actually touching a particular object displayed on the screen, and thereby selecting that object.

So-called "saga-games" are known where there are many different levels which a user can play. One technical challenge with such games is how to provide technical complexity of a game whilst at the same time providing a varied gaming experience for the user. Another significant technical challenge is how to retain casual game play where a user is able to play a game as and when they like while at the same time having an aspect which involves interaction with other players.

This patent specification describes not only various ideas and functions, but also their creative expression. A portion of the disclosure of this patent document therefore contains material to which a claim for copyright is made and notice is hereby given: Copyright King.com Limited 2014 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY

According to an aspect, there is provided a computer device providing a computer implemented game, said computer device comprising: a user interface configured to detect user input from a player of said game, said user input selecting a level of a plurality of levels of the computer implemented game to play, at least one level of said plurality of levels being associated with a difficulty, said difficulty being dependent on a number of attempts made by a plurality of players to complete said level; at least one processor configured to receive the detected user input; a display configured to display first information in dependence on said difficulty; a transmitter configured to transmit information associated with a number of attempts made to complete a respective level by said player; and a receiver configured to receive updated information for the difficulty of at least one level of the plurality of levels.

The first information may comprise information indicating that a respective level is in a given category.

The given category may comprise at least one level satisfying at least one threshold.

The at least one threshold may comprise at least a minimum average number of attempts to complete a respective level by said plurality of players.

The given category may comprise N levels, wherein said N levels have the highest average number of attempts to complete a level and N is an integer.

The given category may comprise a hard category.

The first information may comprise information indicating that a respective level is in one of plurality of different categories. The different categories may be associated with different thresholds. One or more of the categories may have a defined number of levels. The different categories may be associated with different difficulty ranges.

The first information may be dependent on an average number of attempts to complete a level.

The display may be configured to display a plurality of level options, at least one of said plurality of level options being displayed with respective first information.

The at least one processor may be configured in response to selection via said user interface of one of said displayed plurality of level options to cause a game board of the selected level to be displayed, The first information may be displayed only if said level is in said given category.

According to another aspect, there is provided a computer implemented game server, said computer implemented game comprising a plurality of different levels, said server comprising: a receiver configured to receive, from a plurality of different computer devices on which said computer implemented game is played by a group of players, information associated with one or more attempts to play a plurality of levels of said computer implemented game; at least one processor configured to use said received information to determine a difficulty associated with at least one level of said plurality of levels, said difficulty being dependent on a number of attempts made by said group of players to complete said level; and transmitting information relating to the difficulty of at least one level of the plurality of levels to one or more of said plurality of different computer devices.

The at least one processor may be configured to updating a difficulty associated with one or more levels in response to receiving from one or more of said plurality of computer device, further information associated with one or more attempts to play a plurality of levels of said computer implemented game, and transmitting updated information relating to the difficulty at least one level of the plurality of levels to one or more of said plurality of different computer devices.

The transmitted information may comprise information indicating that a respective level is in a given category.

The given category may comprise at least one level satisfying at least one threshold.

The at least one threshold may comprise at least a minimum average number of attempts to complete a respective level by said plurality of players.

The given category may comprise N levels, wherein said N levels have the highest average number of attempts to complete a level and N is an integer.

The given category may comprise a hard category.

The transmitted information may comprise information indicating that a respective level is in one of plurality of different categories. The different categories may be associated with different thresholds. One or more of the categories may have a defined number of levels. The different categories may be associated with different difficulty ranges.

The transmitted information may be dependent on an average number of attempts to complete a level.

According to another aspect, there is provided a computer implemented method providing a computer implemented game comprising: detecting user input from a player of said game, said user input selecting a level of a plurality of levels of the computer implemented game to play, at least one level of said plurality of levels being associated with a difficulty, said difficulty being dependent on a number of attempts made by a plurality of players to complete said level; displaying on a display first information in dependence on said difficulty; transmitting information associated with a number of attempts made to complete a respective level by said player; and receiving updated information for the difficulty of at least one level of the plurality of levels.

The first information may comprise information indicating that a respective level is in a given category.

The given category may comprise at least one level satisfying at least one threshold.

The at least one threshold may comprise at least a minimum average number of attempts to complete a respective level by said plurality of players.

The given category may comprise N levels, wherein said N levels have the highest average number of attempts to complete a level and N is an integer.

The given category may comprise a hard category.

The first information may comprise information indicating that a respective level is in one of plurality of different categories. The different categories may be associated with different thresholds. One or more of the categories may have a defined number of levels. The different categories may be associated with different difficulty ranges.

The first information may be dependent on an average number of attempts to complete a level.

The method may comprise displaying a plurality of level options, at least one of said plurality of level options being displayed with respective first information.

The method may comprise, in response to selection of one of said displayed plurality of level options, causing a game board of the selected level to be displayed, The method may comprise displaying the first information only if said level is in said given category.

According to another aspect, there is provided a computer implemented method comprising: receiving, from a plurality of different computer devices on which a computer implemented game is played by a group of players, information associated with one or more attempts to play a plurality of levels of said computer implemented game; using said received information to determine a difficulty associated with at least one level of said plurality of levels, said difficulty being dependent on a number of attempts made by said group of players to complete said level; and transmitting information relating to the difficulty of at least one level of the plurality of levels to one or more of said plurality of different computer devices.

The first information may comprise information indicating that a respective level is in a given category.

The given category may comprise at least one level satisfying at least one threshold.

The at least one threshold may comprise at least a minimum average number of attempts to complete a respective level by said plurality of players.

The given category may comprise N levels, wherein said N levels have the highest average number of attempts to complete a level and N is an integer.

The given category may comprise a hard category.

The first information may comprise information indicating that a respective level is in one of plurality of different categories. The different categories may be associated with different thresholds. One or more of the categories may have a defined number of levels. The different categories may be associated with different difficulty ranges.

The first information may be dependent on an average number of attempts to complete a level.

According to another aspect, there is provided a computer device providing a computer implemented game, said computer device comprising: a user interface configured to detect user input from a player of said game, said user input selecting a level of a plurality of levels of the computer implemented game to play; at least one processor configured to receive the detected user input and in response thereto providing (a) a game board of said computer implemented game associated with said selected level, (b) first information associated with a number of attempts made by said player to complete said level and (c) second information associated with attempts made by a group of players to complete said level; and a display configured to display the game board, said first information and second information.

The game board, the first information and the second information may displayed at the same time or at different times.

The computer device may comprise a transmitter, said at least one processor configured to cause said transmitter to transmit to a server information associated with at least one failure of said player of said selected level.

The computer device may comprise a transmitter, said at least one processor configured to cause said transmitter to transmit to a server information associated with a success of said player of said selected level.

The computer device may comprise a transmitter, said at least one processor configured to cause said transmitter to transmit to a server information associated with a start by said player of an attempt to pass said selected level.

The computer device may comprise a receiver, said receiver configured to receive at least one of said first and said second information from a server.

The player may be part of said group of players.

The computer device may comprise a counter configured to be updated each time said player one of plays said level and fails said level.

The counter may be configured to be reset when said player completes said selected level.

The second information may comprise an average number of attempts needed complete said level.

The second information may comprise a lowest number of attempts needed to complete said level of said group of players.

The display may be configured to display said first information and said second information with respect to a graphical scale.

The first information may comprise personal best information for said player.

The at least one processor may be configured to determine based on said second information a category for at least one level.

The display may be configured to displaying on said display a plurality of level options, wherein selection of one of said level options causes the game board of the selected level to be displayed, at least one of said plurality of level options being displayed with a respective category.

According to another aspect, there is provided a computer implemented game server, said computer implemented game comprising a plurality of different levels, said server comprising: a receiver configured to receive, from a plurality of different computer devices on which said computer implemented game is played by a group of players, information associated with one or more attempts to play said computer implemented game; at least one processor configured to use said information to update information about a number of attempts to complete respective levels of said game; and transmitting update information associated with attempts made by said group of players to complete said level to one or more of said plurality of different computer devices.

The server may comprise a first counter for a respective level which is updated in response to each attempt to complete said level.

The server may comprise a second counter for a respective level which is updated in response to each successful attempt to complete said respective level.

The at least one processor may be configured to use said first counter and said second counter to determine an average number of attempts taken to complete said level.

The server may be configured to categorise at least one of said levels with respect to at least one other level using said information about the number of attempts to complete a respective level.

The categorisation may be a difficulty categorisation.

The server may comprise an interface for communicating with at least one other server, said at least one other server being configured to communicate with a respective different plurality of user devices, said interface being configured to receive from said at least one other server update information about a number of attempts to complete respective levels of said game for respective players of the different plurality of user devices.

According to another aspect, there is provided a computer implemented method providing a computer implemented game, said method comprising: detecting via a user interface user input from a player of said game, said user input selecting a level of a plurality of levels of the computer implemented game to play; in response to said input displaying a game board of said computer implemented game associated with said selected level, first information associated with a number of attempts made by said player to complete said level and second information associated with attempts made by a group of players to complete said level.

The game board, the first information and the second information may displayed at the same time or at different times.

The method may comprise transmitting to a server information associated with at least one failure of said player of said selected level.

The method may comprise transmitting to a server information associated with a success of said player of said selected level.

The method may comprise transmitting to a server information associated with a start by said player of an attempt to pass said selected level.

The method may comprise receiving at least one of said first and said second information from a server.

The player may be part of said group of players.

The method may comprise updating a count each time said player one of plays said level and fails said level.

The method may comprise resetting the count when said player completes said selected level.

The second information may comprise an average number of attempts needed to complete said level.

The second information may comprise a lowest number of attempts needed to complete said level of said group of players.

The method may comprise displaying said first information and said second information with respect to a graphical scale.

The first information may comprise personal best information for said player.

The method may comprise determining based on said second information a category for at least one level.

The method may comprise displaying on said display a plurality of level options, wherein selection of one of said level options causes the game board of the selected level to be displayed, at least one of said plurality of level options being displayed with a respective category.

According to another aspect, there is provided a computer implemented method comprising: receiving from a plurality of different computer devices on which a computer implemented game is played by a group of players, information associated with one or more attempts to play said computer implemented game; using said information to update information about a number of attempts to complete respective levels of said game; and transmitting update information associated with attempts made by said group of players to complete said level to one or more of said plurality of different computer devices.

The method may comprise updating a first count for a respective level in response to each attempt to complete said level.

The method may comprise updating a second count for a respective level in response to each successful attempt to complete said respective level.

The method may comprise using said first count and said second count to determine an average number of attempts taken to complete said level.

The method may comprise categorising at least one of said levels with respect to at least one other level using said information about the number of attempts to complete a respective level.

The categorisation may be a difficulty categorisation.

The method may comprise communicating with at least one server, said at least one server being configured to communicate with a respective different plurality of user devices, to receive from said at least one server update information about a number of attempts to complete respective levels of said game for respective players of the different plurality of user devices.

According to another aspect, there is provided a non-transitory computer readable storage device storing instructions that, when executed by at least one processor of a computer device causes said at least one processor to perform the following steps: detect via a user interface user input from a player of said game, said user input selecting a level of a plurality of levels of the computer implemented game to play; and in response to said input cause display of a game board of said computer implemented game associated with said selected level, first information associated with a number of attempts made by said player to complete said level and second information associated with attempts made by a group of players to complete said level.

According to another aspect, there is provided a non-transitory computer readable storage device storing instructions that, when executed by at least one processor of a server causes said at least one processor to perform the following steps: receive from a plurality of different computer devices on which a computer implemented game is played by a group of players, information associated with one or more attempts to play said computer implemented game; use said information to update information about a number of attempts to complete respective levels of said game; and transmit update information associated with attempts made by said group of players to complete said level to one or more of said plurality of different computer devices.

According to another aspect, there is provided computer device comprising: at least one processor configured to: use information associated with a plurality of levels of a computer implemented game to determine a category for at least one of said levels, said information providing information about numbers of attempts to complete respective levels for a group of players; and provide an output dependent on said determined category, wherein said at least one processor is configured to repeat the determining of said category for at least one of said levels using updated information to provide an updated output.

The information may comprise an average number of attempts to complete respective levels for the group of players.

The category may be determined based on one or more threshold values.

The one or more threshold values may be one of an absolute threshold value and a relative threshold value.

The threshold values may change over time.

The category may comprise one or more levels which require a highest number of attempts to complete.

The repeating may be performed in real time or periodically or in response to the occurrence of a trigger.

The computer device may comprises a user device.

The computer device may comprise a receiver configured to receive said information from a server.

The computer device may be configured to provide a computer implemented game, said computer device comprising a display, said display configured to display a plurality of different levels, wherein said output is used to control said display to display in association with one least one of said different levels the determined category.

The computer device may comprise a server.

The plurality of levels may comprise one or more chapters of said computer implemented game.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIG. 7 shows a data structure used in some embodiments;

DETAILED DESCRIPTION OF SOME EMBODIMENTS

One example of a game with which embodiments may be used is a 'match-3 game' where the player is required to find patterns on a seemingly chaotic board. The player then has to match three or more of the same type of game element on the game board and those matched elements will then disappear. In some games the user has to match more than 3 game elements.

Figure 1:
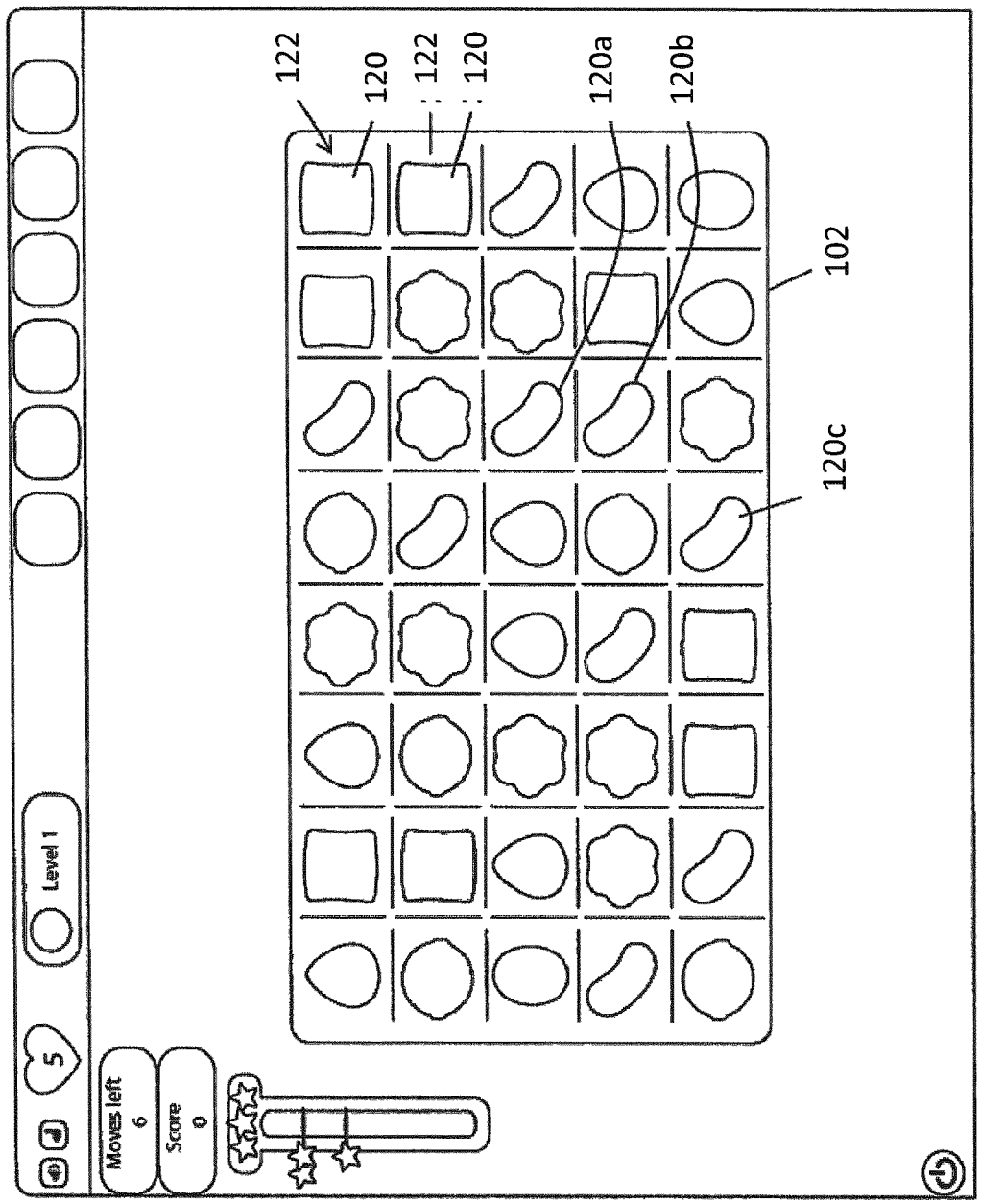
FIG. 1 shows an example embodiment of a game board.

FIG. 1 shows a display of a known version of a match 3 switches game called Candy Crush Saga™. FIG. 1 illustrates a game board 102 with a plurality of game elements 120. The game elements are each of six different shapes and colours. Each game element is supported by a tile 122. The tiles are not readily visible to a player of the game—the game elements are the main focus for a player. However, the tiles govern characteristics of the game elements which are visible to a player as will be described in more detail later.

In the known version of the match 3 switcher game, the aim of the game is to swop game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 1 that game element 120c is moved one place to the right to form a three-line match with game elements 120a and 120b. This has the effect of game board elements 120a, 120b and 120c "disappearing", creating a visual effect (animation) on the screen to indicate the disappearance. The two game elements which were directly above game elements 120a will now fall downwards into the spaces created by the removal of game elements 120a, 120b and 120c. The game elements on the newly created tiles which fall downwards into the game board are generated at random. The user then has a new game board on which to play a subsequent move.

Another example are the so called 'clicker' games where the player can click on a group of adjacent game elements of a certain type and those will then be removed. Some clicker games only require two adjacent objects to remove those elements if clicked by the user. Others may require more than two.

Another type of match games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects.

Another type of match game are the so called 'shooter' games where the player launches for example a ball or bubble on to the game board trying to aim at groups of similar game elements already on the game board. If the launched ball hits or forms a group of more than 3 similar game elements then that group of game elements are removed from the game board.

It is clear that embodiments may be used with any other suitable type of games. In some embodiments, the game may be provided with different levels. Each level may have a specific goal.

Figure 2:
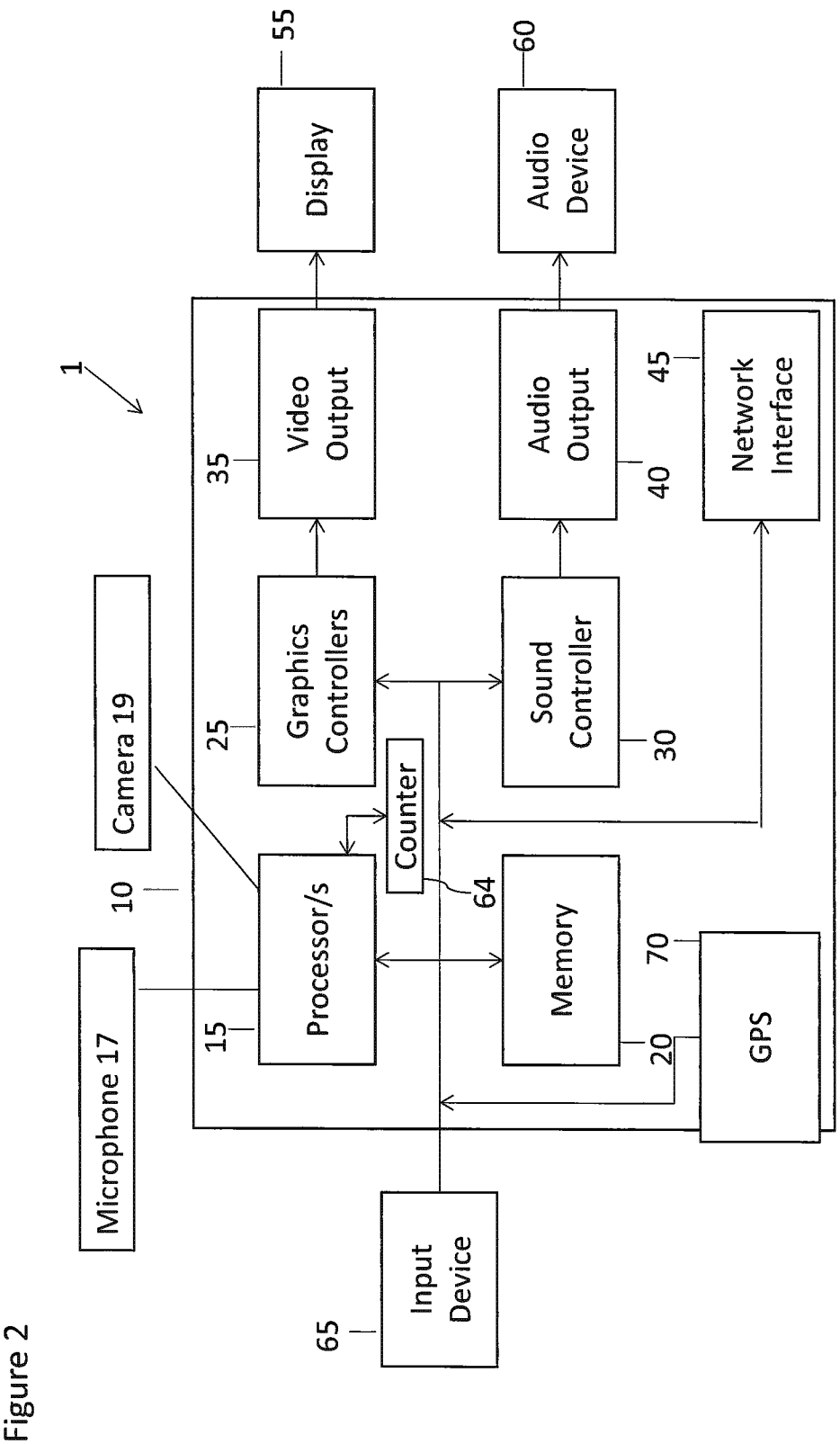
FIG. 2 shows an example user device in which some embodiments may be provided.

A schematic view of a user device 1 according to an embodiment is shown in FIG. 2. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may be provided by the one or more processors 15 or may be separately provided. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

An audio capture device such as a microphone 17 may be provided. An audio input may be captured by the microphone and may be processed by the processor and/or any other suitable processor. This is optional is some embodiments In other embodiments, the sound controller and audio device may additionally capture and process audio data.

An image capture device 19 may be provided. The image capture device is a camera in some embodiments. The image captured by the camera may be processed by the processor and/or any other suitable processor. This is optional is some embodiments The control part 10 has an interface 45 allowing the device to be able to communicate with a network such as the Internet or other communication infrastructure. The control part 10 may have a GPS module 70 or similar configured to provide location information to the at least one processor 15 or memory 20. This is optional is some embodiments.

The device 1 has an input device or user interface 65. The input device can take any suitable format and can be one or more of a keyboard, mouse, touch screen, joystick or game controller. It should be appreciated that the display 55 may in some embodiments also provide the input device 65 by way of an integrated touch screen for example.

The device has a counter 64. The counter may be a hardware counter or a software counter. The counter is configured to communicate with one or more of the processors. Information from the counter may be stored in a counter memory and/or the memory 20. This is used to count number of attempts associated with a level. A separate counter may be provided for each game level or for each game level which has not been completed. Alternatively or additionally, the count value for a particular game level may be loaded into the counter from memory, when a different game level is selected by the user.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

Figure 3:
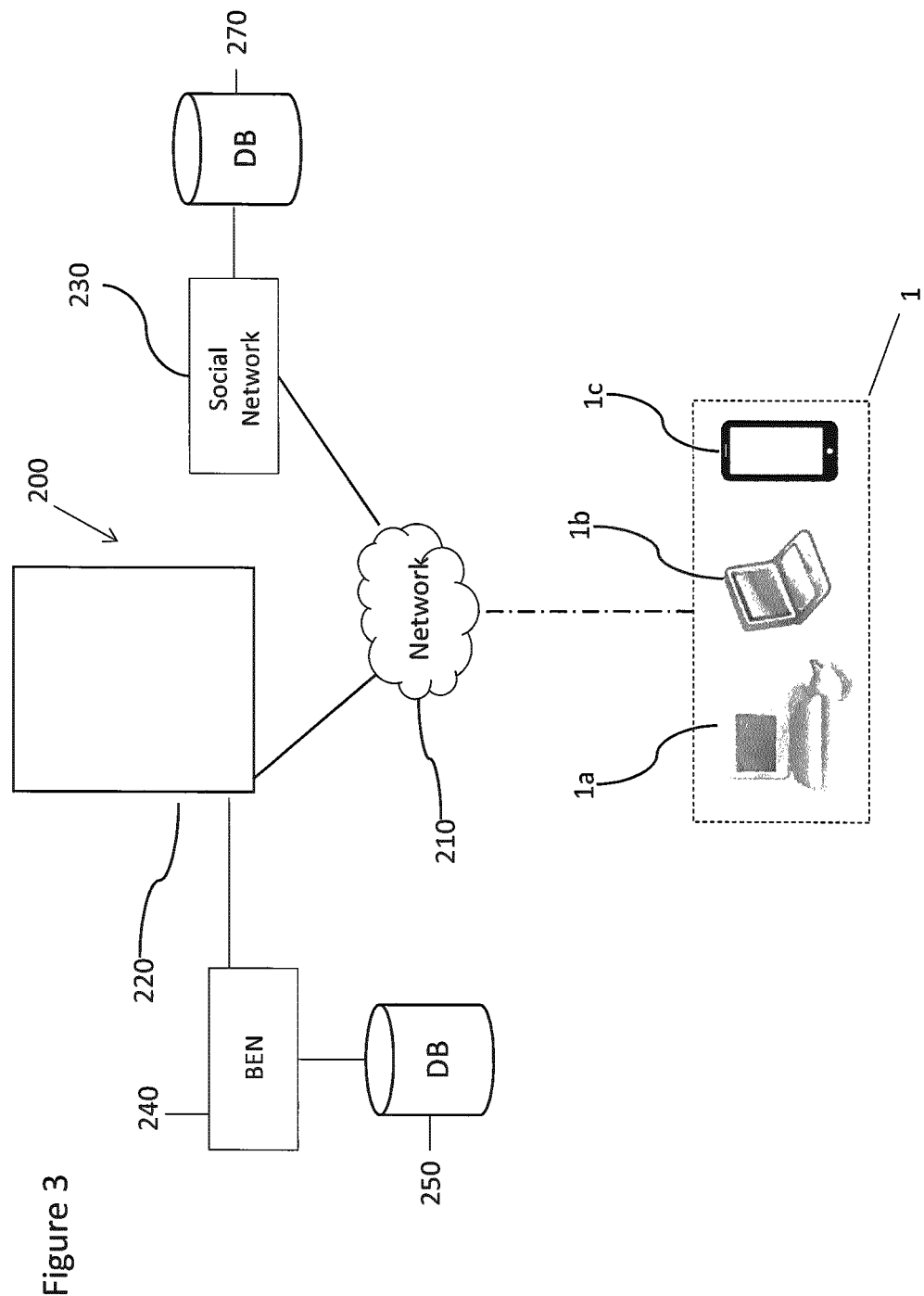
FIG. 3 shows an example system in which some embodiments may be provided.

FIG. 3 schematically shows a system 200 according to an embodiment. The system 200 comprises a server 220 which may store or be in communication with database 250 which may, in some embodiments, be connected to a back end infrastructure (BEN) of game player's details, profiles, statistics etc. In practice, one or more databases 250 may be provided. In practice, one or more servers 220 may be provided. Where one or more server is provided, the database(s) 250 may be provided in one database 250 across two or more servers.

The server 220 may communicate via, for instance, the internet 210 to one or more client or user devices 1, shown in FIG. 3 by way of example as user devices 1a, 1b and 1c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of the database 270 being made on the user device 1.

It should be recognised by those skilled in the art that the databases herein referred to may comprise external or remote storage, such as that described as being in a "cloud".

It should be appreciated that embodiments may be deployed in different system architectures. For example, the computer game may be implemented as a computer game that is stored in the memory of the user device and is run on the processor of the user device. However, the server may handle some elements of the game in some embodiments. By way of example only, a Java game applet may be provided to the user device and the locally running Java applet will generate, for example, the graphics, sounds, and user interaction for the game play on the user device. Some data may be fed back to the server to allow interaction with other user devices 305. The data which is fed back may also allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

The game may be played in an offline mode on a handheld device using locally stored information on the handheld device. The device may store all or some of the levels that are available as applicable to the particular game and its saga or mission objectives. Some of the features may be locally executed on the device. This may for instance implement a scheme to regenerate lives after a certain period of time, the time may be locally decided based on the clock on the device. In some embodiments, the central game server clock may override the local clock when the local device has been synchronised with the server.

Some embodiments may be implemented to synchronize game state information and/or retrieve and connect to social graph information and user profile data on a social network such as Facebook or Google+.

Some embodiments may be implemented to enable connection to a plurality of social networks. The user may be given the option to select which information may be derived and/or shared with which social network.

Some embodiments may be provided in the context of so-called saga games. These are games which have one or more levels. In some games, a user may be required to complete a certain level before the user is able to progress to a next level. In some embodiments, the user may be able to go back and play any previous level.

A game may have a number of different levels. Different levels may have different requirements to be met. For example, some levels may have one or more specific goals. These goals could be to reach a certain amount of points before running out of moves or time; to bring down certain game elements to the bottom of the screen; to remove a certain amount of game elements before running out of moves or to collect certain game elements through specific matches before running out of moves. These are by of example only, and any other additional or alternative goals may be provided.

If the game becomes difficult there are boosters to help the player pass a level. These can be obtained from in-game purchases or received as gifts from Facebook friends.

Figure 5:
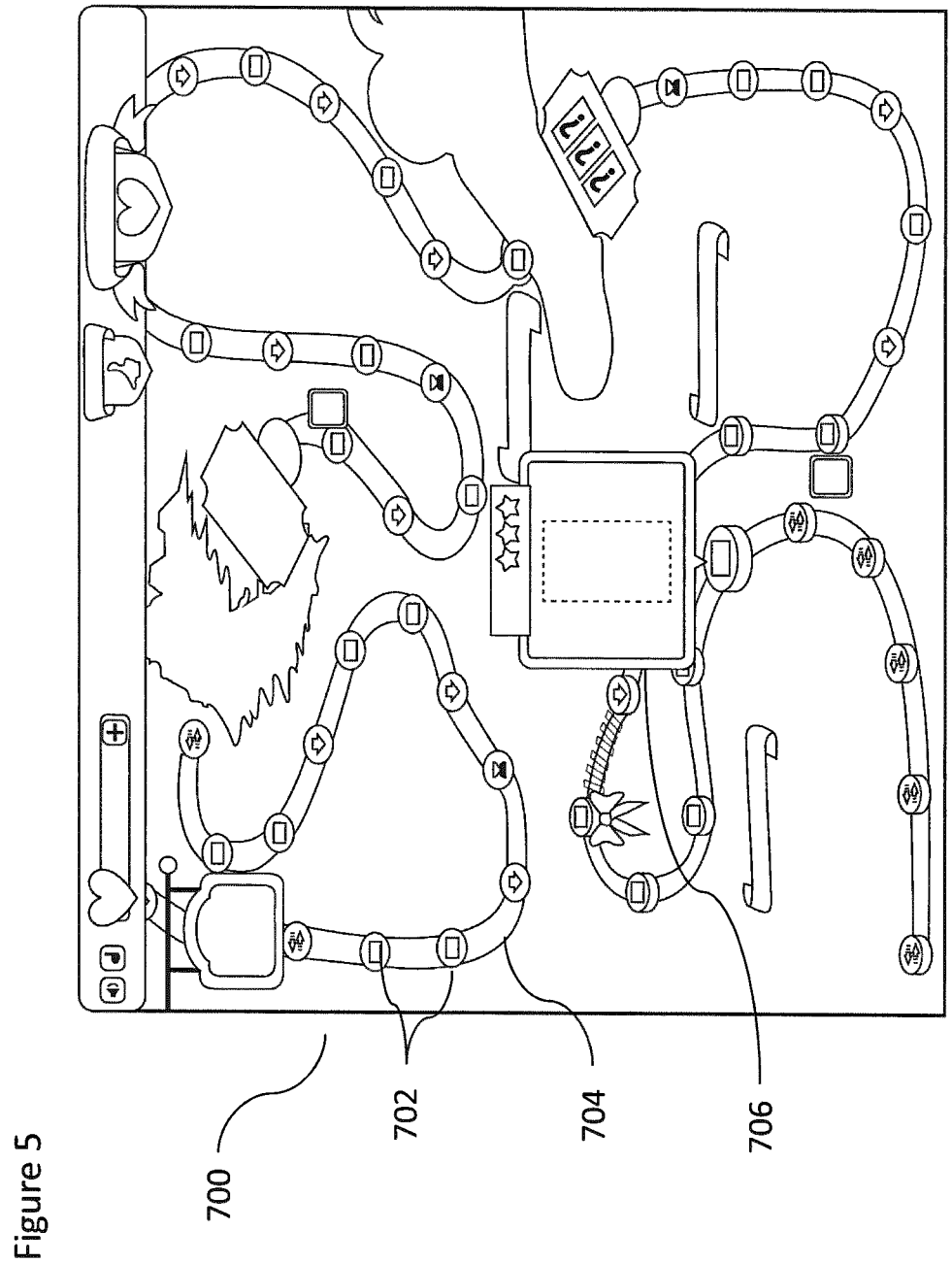
FIG. 5 schematically shows a representation of different levels of a game.

In some embodiments, the different levels may be represented on a map 700. FIG. 5 schematically shows one example of such a view. Different levels 702 are represented on a path 704 so that the user can see the progress which he has made playing the game. This also allows a user to go back and replay levels which he has previously played. The map view may show what levels have been completed as well as how many levels are left to play. Throughout the game and for each level completed, the player journeys across the map. In some embodiments, the levels are divided up into groups or chapters. These may be referred to as episodes. In some embodiments, there may be a theme associated with each chapter.

In some embodiments, if the player has connected to a social network, then friends' progress from the same network may be viewed on the map by the means of information provided next to the highest level they have currently reached or by virtual of a league table which can be displayed.

In the map view, the player can hover over a level to display a thumbnail 706 of it. This makes it easier to find specific already completed levels, and can also give the player an idea of what to expect before actually starting a level. In some embodiments, thumbnails can be displayed for any level. In some embodiments, no thumbnails can be displayed for levels that have not yet been reached. In some embodiments, the thumbnail option is not provided.

Information may be provided on the map to display how well the player has done on the level if he has played it previously. This can for instance be represented with the number of stars the player has received on that level, the actual score or some other indication. This may be done via the thumbnail option, by displaying information on the map or by any other suitable mechanism.

When navigating on a map in a game, it may sometimes be difficult to find desired level or area of the map if the map is, for example, too large relative to the available display. In some embodiments, a smaller version 720 of the map is displayed. The user is able to select a part of that map to be displayed on the display such that the part of the map displayed is larger than when the entire map is displayed. The smaller version of the map will highlight the part of the map which is being displayed in enlarged from.

Figure 6:
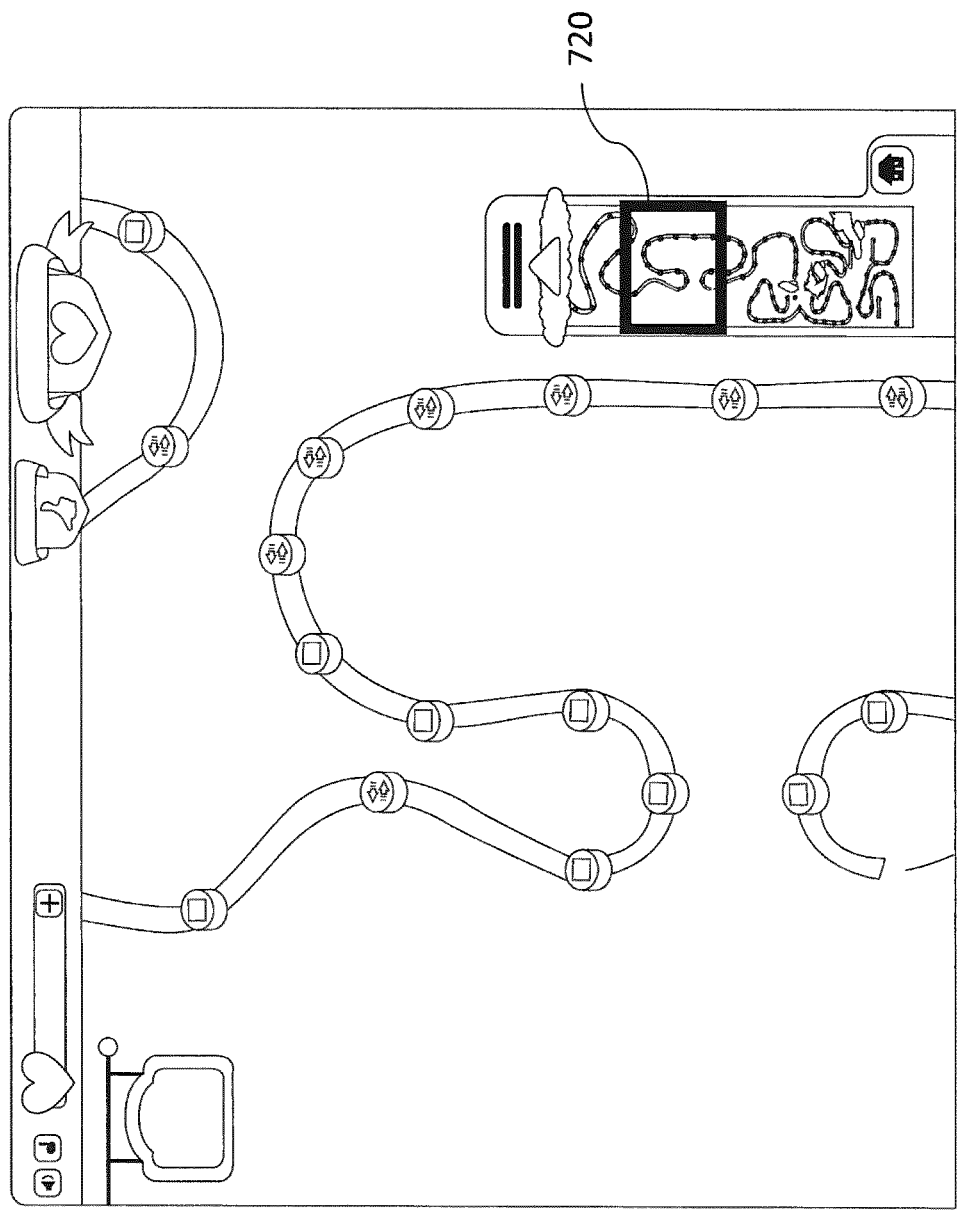
FIG. 6 schematically shows a zoomed representation of some of the different levels of the game.

In some embodiments, the smaller version of the map is only in full view when the player needs it; the rest of the time the smaller version of the map may be hidden with only a small part of it showing. Clicking on this small part will expand the smaller version of the map such as shown in FIG. 6 and referenced 720 and let the player use it. Clicking on the same part again will once more hide the smaller version of the map. When the smaller version of the map is expanded, the player is provided with a mini map showing an area of the map. The player can select anywhere on the mini map and when doing so the main view will jump to the same location, but zoomed in. The player may also scroll through the mini map which will then simultaneously scroll the map in the main view.

In some embodiments, the game can be implemented so that a player progresses through multiple levels of changing and typically increasing difficulty. As the player travels through the levels in the game, his progress may be represented as a journey along a path in the virtual map.

In some embodiments, the player moves between levels and completes the levels one by one along a path by playing the associated game. When the player reaches the goal of a level, the next level is unlocked and the player can play that level in the game.

The number of stages and levels can vary depending on the implementation. The levels may be numbered consecutively throughout the game or they can be numbered within a stage, it is also understood that other ways of identifying the levels can be provided.

One way of unlocking new stages is to complete the last level on the latest stage. The user may in some embodiments be provided with challenges to unlock the next stage in the virtual map.

In some embodiments, the user can play any of the unlocked levels on the map, so the user can go back and replay already completed levels to get a better score or beat friends' high scores.

Figure 10:
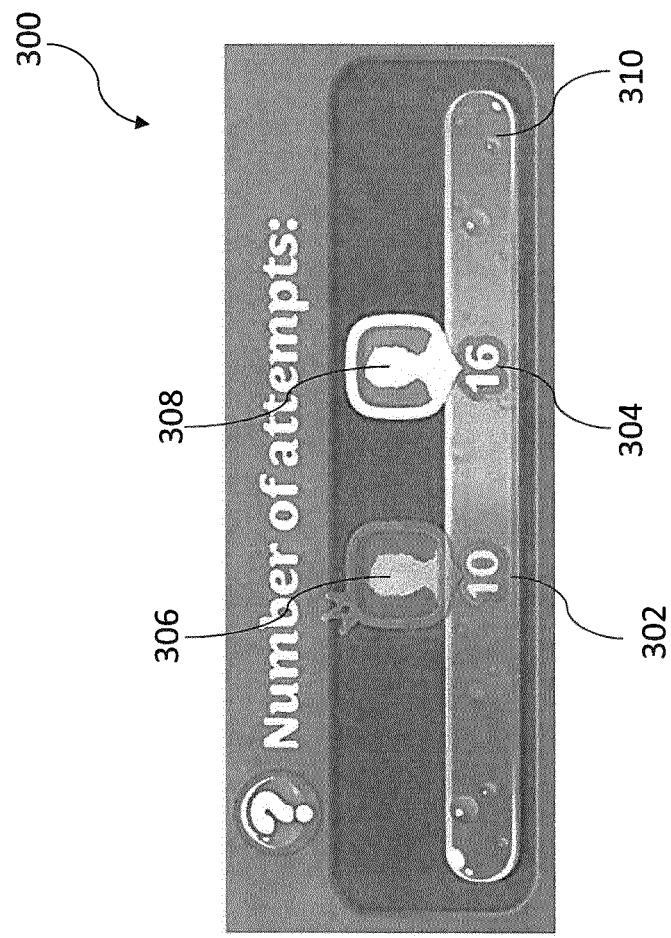
FIG. 10 shows an example of information displayed about number of attempts associated with a level.

Reference is made to FIG. 10 which shows information 300 which is displayed on the display of the user device. This information allows the user to measure their performance against other players. In the example shown, the user is able to measure their performance against a group of players, who have also played this level. In this example, the information comprises a score line 310 where the position on this line represents the number of attempts to complete a particular level. The number of attempts taken by a user is referenced 304, in this example. The score information may be associated with an icon or the like which represents the player. This icon 308 may be an avatar or the like. The score line 310 also shows the score 302 which is the user's record for completing that level. The icon or avatar 306 displayed next to the score 302 will be such as to indicate to the user that this is their record for completing the level. For example, the icon 306 may have a crown or similar symbol.

It should be appreciated that in some embodiments the position of the player's icon and/or score on that score line allows the player to measure their performance against the group of players. In this regard, reference is made to FIG. 11 which shows information 320 displayed on the display to explain the score line. As can be seen, the score line 310 is divided into a first area 326, a second area 324 and a third area 322. The first area which is at the left hand side of the score line shows that the total number of attempts taken to complete a level in that area is less than the average of the group of players. Any total number of attempts taken to complete a level which is in the middle region of 324 will be average for the group of players. Any total number of attempts taken to complete a level which is in the third area 322 will be a greater number of attempts than the average for the group of players.

In some embodiments, these three areas may be displayed in a visually distinct manner. For example, area 326 may be shown in green, area 324 may be shown in yellow and area 322 may be shown in red. It should be appreciated that this visual distinction of the areas is by way of example only. In those embodiments which show different areas, the number of regions may be greater or less than 3.

In other embodiments the position of the user's number of attempts along the score line is simply used to provide the information as to the user's performance with respect to the group of players.

In some embodiments, information about how many attempts the top x percent of users take to pass a level may be provided. This information may be provided on the score line or otherwise. X may be any suitable value such as 25%, 15%, 20%, 10% or any other suitable value.

Figure 11:
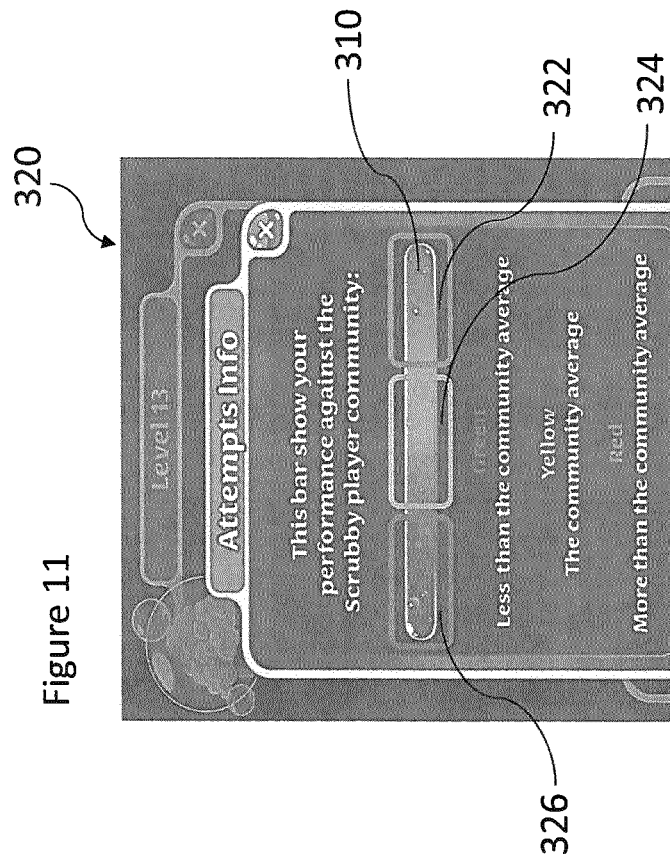
FIG. 11 shows example information displayed to explain the information of FIG. 10.

It should be appreciated that the information displayed in FIG. 11 may be omitted in some embodiments.

Figure 12:
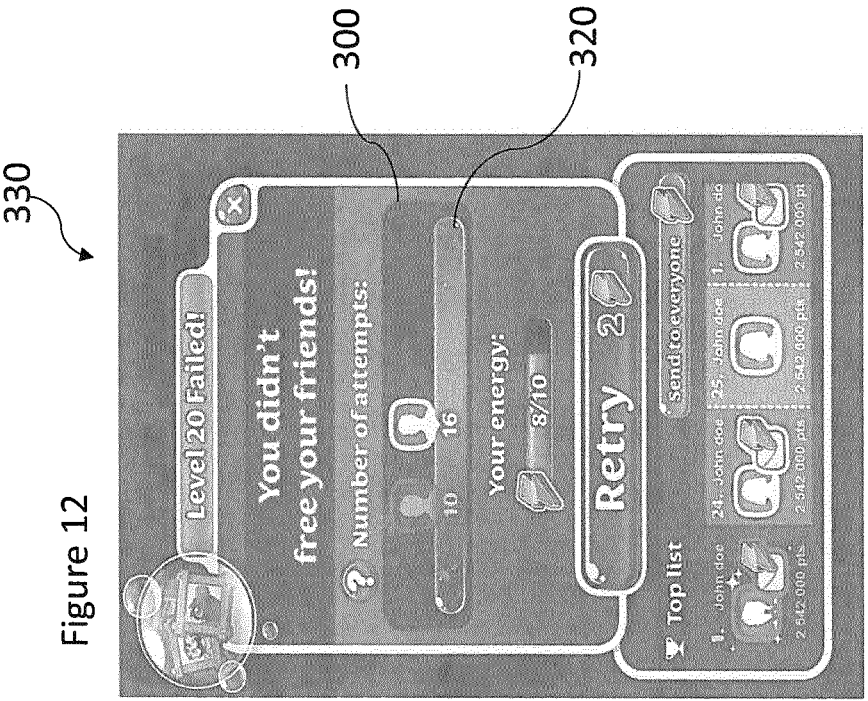
FIG. 12 show example information which is displayed when an attempt to complete a level fails.

In FIG. 12, information 330 which is displayed when a player fails a level is shown. This information will include the information 300 as well as the score line 320. It should be appreciated that the number of attempts will be incremented by one if the user fails to complete this level.

In the examples shown in FIGS. 10, 11 and 12, the score line is represented by a linear bar extending from left to right. It should be appreciated that in other embodiments, the score line may be vertical or at an angle. In some embodiments, the score line or the like may be implemented in a curved fashion. The score line may have any suitable shape in some embodiments.

It should be appreciated that in some embodiments, the score line may be omitted and the information may be presented in any other suitable manner. For example, the information may be presented on a wheel or partial wheel. The information may be displayed in a list format in other embodiments.

In some embodiments, the player's current number of attempts is displayed with information indicating a difference to the group average.

In some embodiments, alternatively or additionally, information about the number of attempts taken to complete a level of one or more social contacts of the player may be shown.

In some embodiments, alternatively or additionally, information about the fewest number of attempts taken to complete a level by any player may be shown.

In some embodiments the position of the user shown with respect to the score line may be controlled in a non-linear way. An example formula for controlling the position of the user with respect to the score line is below:

$$\text{Position in the bar} = 1 - \exp(-\text{NumberOfAttempts} * \ln(2)/(\text{AverageAttempts}) * \text{Length Of The Bar in pixels}$$

ln=natural logarithm

In the area on the left side of the score bar, the icon will move faster than in the area on the right side of the score bar.

In some embodiments, the movement in each level may be different.

Figure 8:
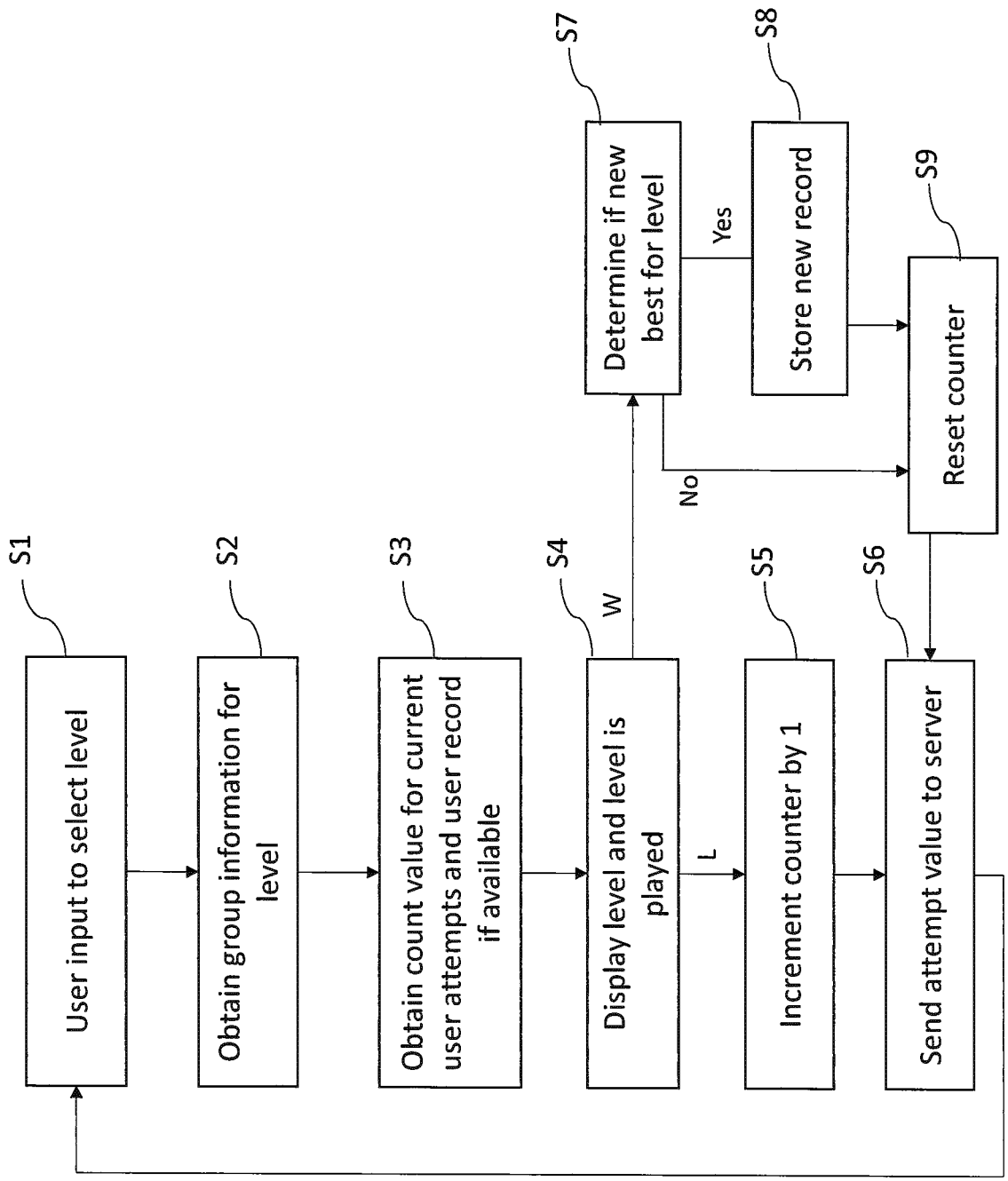
FIG. 8 is a flowchart according to an embodiment which may be carried out a user device.

Reference is made to FIG. 8 which shows a method performed in some embodiments in a user device. The method is a computer implemented method.

In step S1, the user device receives, via the user interface, user input to select one of the levels. For example, in the case where the user interface is provided by a touchscreen, the user input may be received in response to the user touching a node or icon associated with a particular level to be played. In other embodiments, the interaction by the user may be via a pointer device.

In step S2, the at least one processor of the device is configured to obtain group information for the level. This may be done by the user device sending a request to the server to obtain the current group information for that level and/or in response to information sent by the user device to the server. That information may for example be game start information with level information and/or any other suitable information.

In some embodiments the group information may comprise information about the average number of attempts taken by the group of users to complete a particular level.

Alternatively, the group information may be pushed by the server to the user device. In that case, the group information may be obtained from local memory. In some embodiments, a combination of these approaches may be used.

In some embodiments, where the user is playing offline, the most up to date group information available to the user device is used. This will be the information which has previously been received from the server, when the user device was last on line.

In step S3, the at least one processor is configured to obtain a count value for the current number of attempts to complete that level and, if available the user's personal best number of attempts taken to complete the level.

If the user has not previously played that level, then the count value will be zero and there will be no personal best for that level. If the last attempt of the user to play a level was successful, then the count value will be zero. In this case, personal best information will be available.

If, however, the user has previously played that level, then the previous number of attempts is obtained. This may be stored in the local counter or memory on the device and/or may be obtained from the server.

Where the information is obtained from the server, the local counter value may be updated. Likewise, the user's personal best record may be stored locally on the user and/or may be obtained from the server.

In some embodiments, count information and/or personal best information may be stored on the user device but may be updated by the server depending on if the user has played the level on a different device, for example.

In step S4, the at least one processor is configured to display information, for example as shown in FIG. 10 which shows the number of attempts which have been made by the user so far to complete the level without success. Additionally, the display displays the game board for that layer level. The user is able to play that game by interacting with the displayed game board via the user interface.

If the user is successful (wins) and completes the level, then the next step is step S7.

In step S7, it is determined if this is a new personal best for the level. In other words has the player managed to complete the level in a fewer number of attempts than previously. If this is the first time that the level is completed, then this will be the user's personal best for that level.

If there is a new personal best or a first personal best for the level, then the next step is step S8 in which the new record for the personal best is stored.

If not, the next step is step S9. It be noted that step S9 also follows step S8. The counter in the user device regarding the number of attempts made to complete a particular level is reset to 0.

This is followed by step S6 which will be discussed later.

If it is determined that the user has been unsuccessful in his attempt to complete the level (step S4), then the next step is step S5 where the counter, which records the number of attempts to complete a level, is incremented by one.

This is followed by step S6. In step S6 information is sent to the server. This information will indicate whether or not the user has successfully completed or not the particular level being played. The information which is sent to the server will be discussed in more detail later.

Step S6 may be followed by step S1. Steps S2 and S3 may be omitted for one or more successive attempts to complete a given level as this information may be available from the previous attempt to complete the level.

Reference is made to FIG. 7 which shows a data structure used in some embodiments. The user device is configured to use this data structure to send information to the server. It should be appreciated that one or more additional fields may be part of this data structure. One or more of the shown fields may be omitted.

The first field 730 may comprise player identity information or any information which identifies the player to the server. This may for example have a session number where a session number has been allocated to a player or the like.

The second field 732 may have game information identifying the game. This information may sent in a different message, in some embodiments. In some embodiments, this information is omitted if it is inherent as to which game is being played.

The third field 734 may comprise the level number.

The fourth field 736 may comprise the level result. This may comprise information indicating that the level has been completed. In some embodiments, this may indicate if a level has not been completed. In some embodiments, this field may comprise game start information instead of the level result.

It should be appreciated that in different embodiments, the fields may be different.

Figure 4:
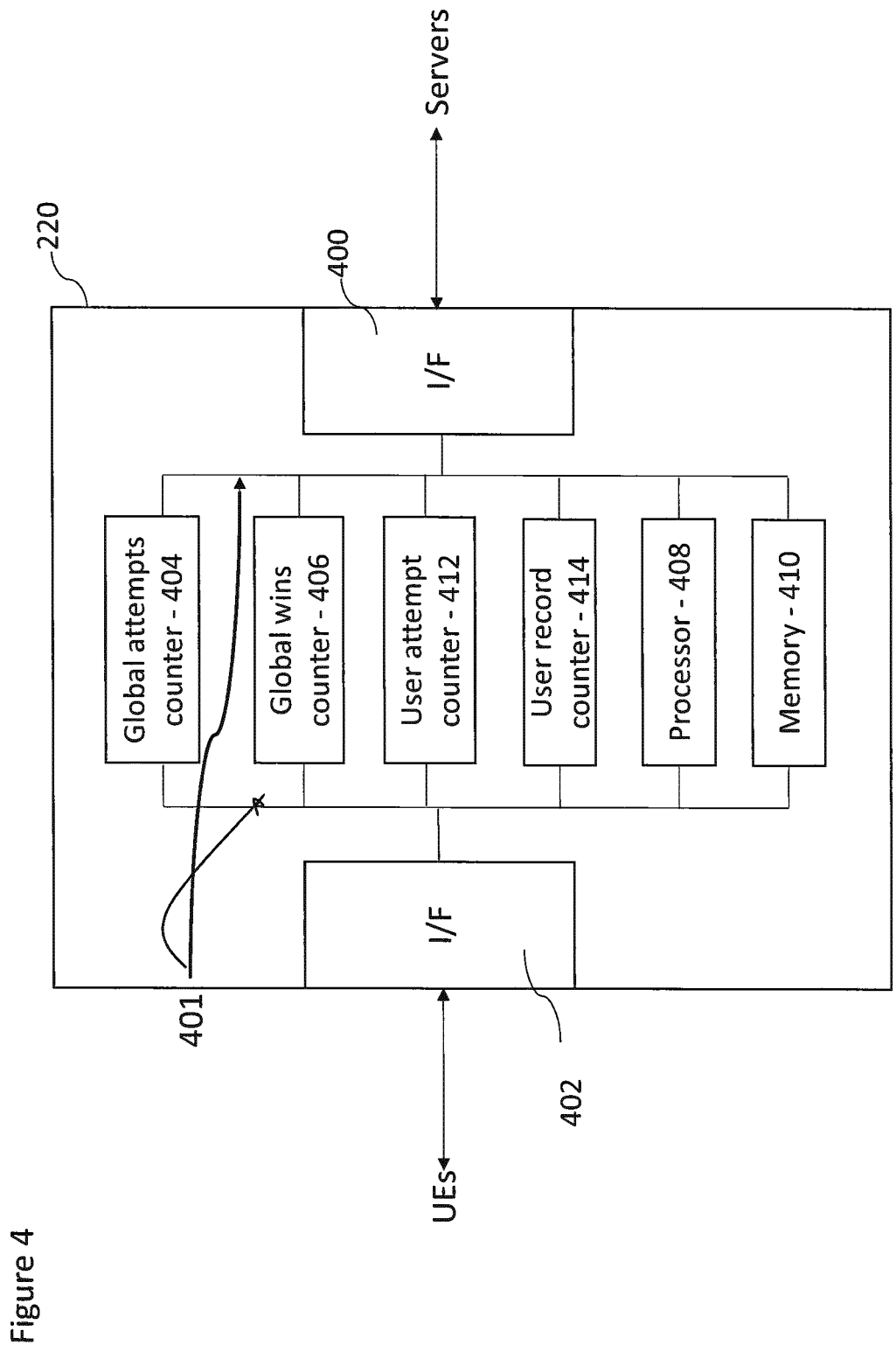
FIG. 4 shows an example server device of some embodiments.

Reference is made to FIG. 4 which shows a server according to some embodiments. The server comprises a first interface 402. This interface is configured to communicate with a plurality of user devices. This may be as discussed in relation to FIG. 3.

The server 220 has a second interface 400 which is configured to communicate with one or more other servers. It should be appreciated that the servers may be connected by point to point connections or via a network. In some embodiments, the servers may communicate via the Internet.

The server has a first global attempts counter 404. The server also has a global wins counter 406. It should be appreciated that a separate global attempts counter 404 and global wins counter 406 is provided for each level.

For each user, for a given level, a user attempt counter 412 and a user personal best record counter 414 is provided.

It should be appreciated that these counters may be provided in hardware and/or software. The server 220 also comprises at least one processor 408 and at least one memory 410.

The illustrated parts of the server are configured to communicate via an interconnect 401.

The server thus keeps or persists the above counters for each level. The global attempts counter in some embodiments will count all the number of starts made of a level, regardless of the outcome. In other embodiments, the global attempts counter will instead will count the number of times a level is failed by all the group of players. The global attempts counter determines the number of attempts at a level across the group of users.

The global wins counter records each successful attempt to complete a given level. The per user counters will count the same events as the global counters but for a specific user.

A game start is invoked every time a level is played and this increments by one the global start counter and the respective user level attempt counter. When a game is entered, if the result of the game was a win, i.e. the level was completed, then the global level win counter is incremented by one. If the user has completed the level in a fewer number of attempts as compared to the user's personal best for that level, then a new record or personal best is set for that user. That new record will have the value of the respective user level attempt counter. The user level attempt counter will then be reset to 0 for that user.

In some embodiments, the global counter is not "segmented", meaning that there are global game starts and global game wins across the whole set of players, not on a per user basis. The information can be segmented for user counters. For example, it is possible provide to the user, friends records or the current attempt counter.

The server(s) 220 may also have a games data function. This may use the one or more memories to store the computer game program, user behaviour data and a control part to run the games program and process the user behaviour data. The control part may comprise one or more processors.

Figure 9:
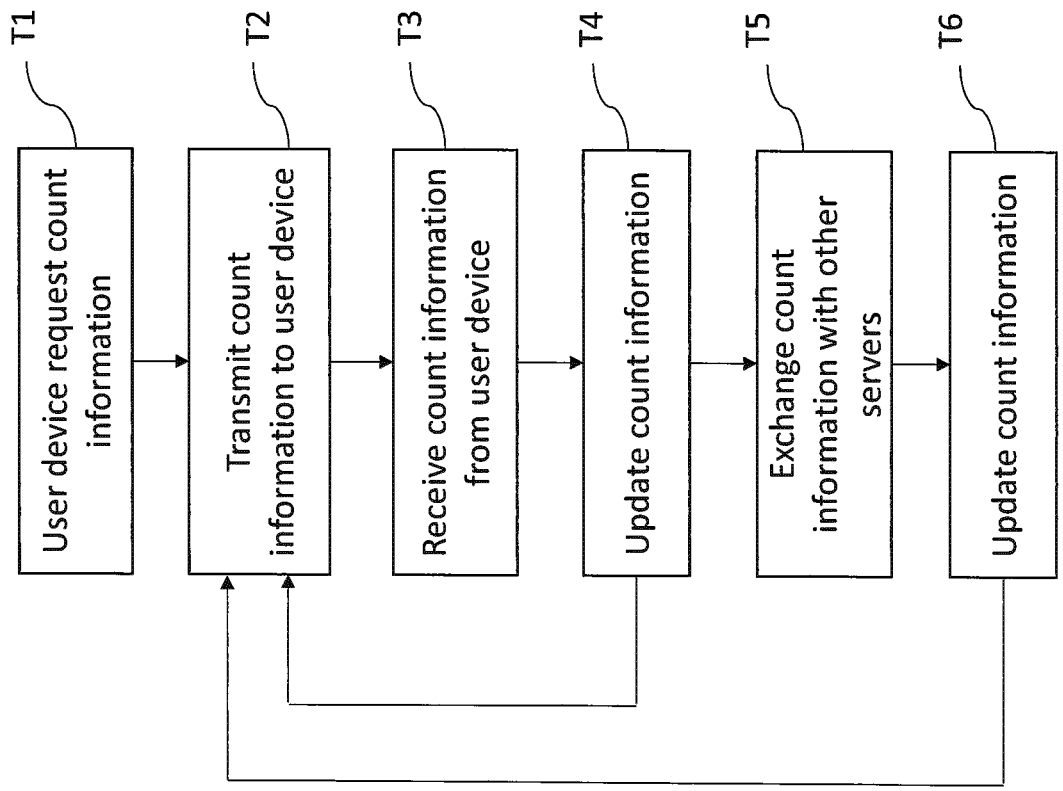
FIG. 9 is a flowchart according to an embodiment which may be carried out in a server.

Reference is made to FIG. 9 which is schematically shows the steps performed in the server in some embodiments.

In step T1, the server receives a request from a user device for count information or a message which prompts the server to provide count information. The user device may specifically request count information. Alternatively or additionally, in some situations, the count information may be pushed to the user device. The count information may be for populating the score line of FIG. 10. This information may comprise the count information for the global counters or may be information derived from the global counters. For example this may be information about the average number of attempts taken by the group of players to complete a particular level and/or information about the spread of values and/or the like.

The information requested may also be for information associated with the particular user, that is, any personal best information for the user and/or the current number of failed attempts for that particular level.

In step T2, the count information is transmitted to the user device.

In step T3, the server receives count information from the user device. This count information will indicate if the level has been successfully completed or not.

The received information is used in step T4 to update the count information captured at the server. In some embodiments, the server may loop to step T2 and push updated count information to one or more user devices.

In the step T5, the server is configured to exchange count information with one or more other servers. This is so as to update the count information to reflect the activities of those of the group of players which are served by a different server.

In step T6, the count information at the server is updated to reflect the activity of the other players which are served by one or more other servers. This may be followed by step T2.

The synchronisation may be performed in any suitable manner. For example for a given server, the current counter value of each of the global counters is compared to the value of the counter values of the global counters at the time of the last synchronisation. The difference represents the amount by which the respective counters need to be incremented in another server.

The difference may be determined in the given server or in the another server. The respective count values at the time of the last synchronisation may be stored in the given server and/or the another server.

In some embodiments, a respective synchronisation counters may be provided in the given server. At synchronisation, the respective counters are reset or set to zero. The synchronisation counters will increment along with the respective global counters. At the time of synchronisation, the start count values and game win counts in the respective synchronisation counters are provided to the another server and the respective synchronisation counters are reset to zero.

It should be appreciated that in other embodiments, any other suitable method of synchronisation may be used.

Figure 13:
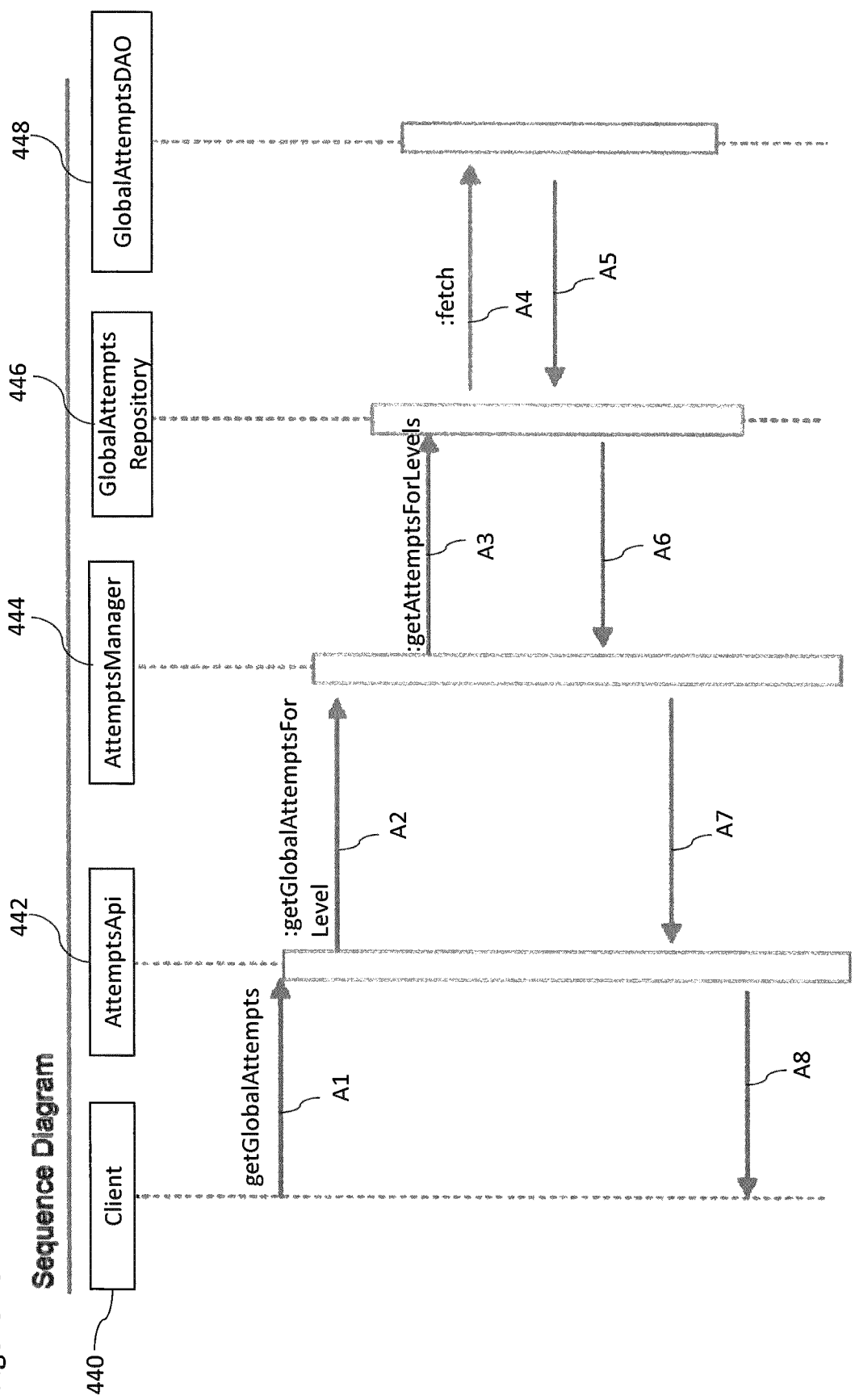
FIG. 13 schematically shows data flow in the server in some embodiments.

Reference is made to FIG. 13 which shows a diagram of an attempts API (application programmable interface) call process to obtain global count information. A get global attempts API is invoked when a client wants to know the attempt average for a list of one or more levels, for the group of players. Similarly, a get user attempts API is invoked when a client wants to know the current counter and record for a list of one or more levels associated with the particular user. The following are the steps associated with a call process to obtain global count information.

In step A1, a client 440 makes a get global attempts call to an attempts API 442.

In step A2, the attempts API 442 sends a get global attempts for level call to an attempts manager 444.

The attempts of manager 444 sends a get attempts for levels call in step A3 to a global attempts repository 446.

The global attempts repository 446 sent a fetch request in step A4 to the global attempts DA0 448.

The global attempts DA0 448 provides the requested data to the global attempts repository in step A5.

That data is sent from the global attempts repository to the attempts manager 444 in step A6, from the attempts manager 444 to the attempts API 442 in step A7 and from the attempts API to the client 440 in step A8.

It should be appreciated that the group of players may be all of the players playing the game or may be a subset of players. For example, the subset of players may be a group of players which are "friends" or social contacts of the user. In other embodiments the group of players may be associated with a group of one or more servers. It should be appreciated that the user will be part of the group of players on which the global values are based.

In some embodiments, alternatively or additionally, a global count may be provided over a set of levels, for example an episode or chapter.

In some embodiments, an indication may be provided as to how well a user has performed compared to the group of players. For example, a star system may be used where the user is awarded 3 stars if the user has performed better than average, 2 stars if the user has performed at the average and one start if the user has performed the below the average. It should be appreciated that the number of stars and indeed the use of stars itself is by way of example only and any other representation may be used to measure the success of the user with respect to the group.

In other embodiments, different criteria may be used to indicate that the user has performed particularly well with respect to the group of users. For example, a message to the user may be provided, an animated image may move indicating good performance, a celebratory sound may be played and/or the like.

In some embodiments, if the player is playing with two or more devices at the same time with the same account, the attempt information will update in both devices, in real-time, assuming both devices are connected.

In some embodiments, the information which is collected can be used to identify one or more levels as having a particular category, for example a hard category. By way of example, a level can be categorised as being hard depending on the number of attempts required in order to pass that level on average. It should be appreciated that one or more additional or alternative categories can be provided.

In some embodiments, the server will make a determination as to whether or not a level is considered to be hard depending on the average number of moves required to complete that level. Information about the categorisation of the level may be provided by the server to the user device at an appropriate time.

Alternatively, the user device may be provided with information which allows the user device to make a determination as to whether or not a level is considered to be of a particular category. For example, the user device may receive reference count information and based on the global count information with respect to the reference count information make a determination that the level is of the particular category.

In other embodiments, the categorisation may be based on percentage values. For example, the top N levels or top M percent of levels having the highest average number of attempts to be completed may be categorised in a particular category, e.g. hard. In some embodiments, this categorisation may be done by the server. In other embodiments, this categorisation may be made by the user device.

Figure 14:
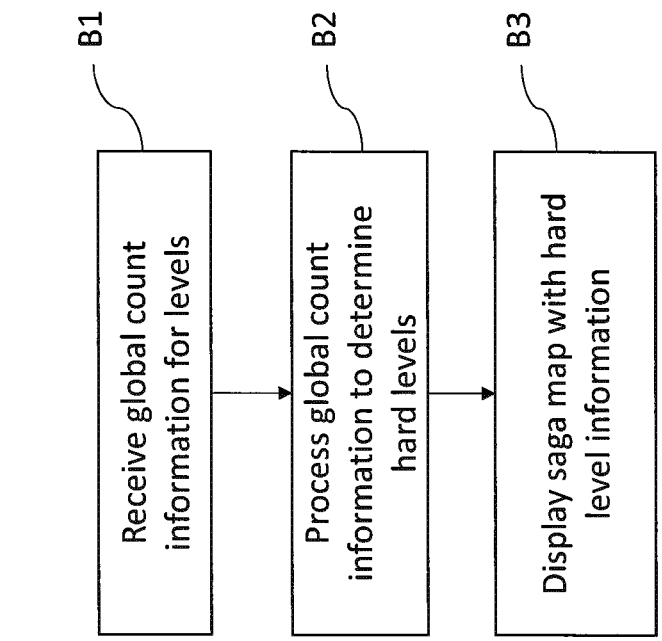
FIG. 14 shows a flowchart according to an embodiment which may be carried out in the user device.

Reference is made to FIG. 14. This method may be performed in a user device.

In step B1, the user device may receive global information for a plurality of the levels. In some embodiments, this may be for all of the levels. In other embodiments, the information may be for a subset of the levels. The subset of levels may comprise one or more episodes/chapters. In some embodiments, the levels may be selected in dependence on the user's current progress through the saga map.

The global information may be the information which has been discussed previously. This may be the number of game starts/losses and/or the number of game wins.

The global information may provide information about the average number of attempts to taken to complete a level.

The global information may be the global number of game starts/game losses and the global number of wins.

In some embodiments, the global information may comprise a set of information. The set of information may comprise one or more of: a best value across the group of players: a worst value across the group of players; an average across the group of players; and one or more average value across a subset of users. Additionally or alternative information may be provided in other embodiments.

The best value may be the fewest number of attempts required by any player of the group of players to complete a level.

The worst value may be the most number of attempts required by any player of the group of players to complete a level.

The average value across the group of players is the average number of attempts required by the players of the group to complete a level.

The average value across a subset of users may divide the set of player in any suitable way. The subset of may be depend on the performance of the players. For example, an average may be provided for the top y percent of players who require the fewest number of attempts to complete a level. Y can be any suitable value. By way of example only, y may be 10%. The subset or subsets can be defined in any other suitable way in dependence on the performance of players.

In some embodiments, one or more subset may alternatively or additionally be dependent on one or other factors not related to the performance of the player. By way of example only, one or more of the following factors may be used to define a subset: Location of user; current position in the game; age of result; age of player; and/or the like.

Using the information which is received from the server, the user device is able to determine which of the levels are to be categorised as hard levels. This is performed in step B2.

This may be done on an absolute basis. For example any level which satisfies a threshold criteria may be considered to be a hard level. The absolute threshold level can be defined any suitable way. It may for example be based on the average number of attempts taken to complete the level or may be with respect to the average number of attempts taken by the top y % to complete a level or the like.

In some embodiments, where an absolute threshold is used, a check is made to determine if the number of levels which are categorised as hard does not exceed a certain number. If so, the method may comprise reducing the number of levels which are categorised as hard. This may be done by raising the threshold. If the threshold is raised, this may be stored and used as the new threshold.

Other embodiments may use different techniques to reduce the number of levels categorised as hard, for example by discarding one or more of the levels which are categorised as hard and have the lowest number of attempts required to succeed at that level.

In some embodiments, where an absolute threshold is used, a check is made to determine if the number of levels which are categorised as hard does not fall below a certain number. If so, the method may comprise increasing the number of levels which are categorised as hard. This may be done by lowering the threshold. If the threshold is lowered, this may be stored and used as the new threshold.

Other embodiments may use different techniques to increase the number of levels categorised as hard, for example by including one or more of the levels which are not categorised as hard and have the highest number of attempts required to succeed at that level.

The absolute threshold may be updated over time by the server, the device or by a combination of the user device and the server.

Alternatively, the levels may be categorised as hard depending on a comparative measure. Accordingly, those z (where z is an integer) levels which have the highest average number of attempts to complete may be categorised as hard level.

In step B3, the saga map is displayed and those levels which are categorised as hard are displayed as such with any suitable indication. This may be way of an associated icon, a level node may be displayed in a visually distinct manner, with a caption or the like It shall be appreciated that the first two steps of the method shown in FIG. 14 can be repeated so as to provide updated information as to which levels are considered hard.

It should be appreciated that in other embodiments the first two steps may alternatively be performed in the server. This embodiment is described in relation to FIG. 15.

The server may then push the information about which levels are considered to be hard to the individual user devices or provide that information to a user device in response to a message from the user device.

Thus in some embodiments, the determination of a hard level is performed by the server. The user device may pull or request the information about the hard levels from the server. The information can in some embodiments be pushed to the user device. In some embodiments, this means that no decisions need to be taken on the client.

The first two steps of the method may be updated on the fly as the global information is updated.

Alternatively the first two steps of the method may be performed periodically. Alternatively, the first two steps of the method shown in FIG. 14 may be triggered every time the user starts to play the game and/or starts to play a level or in response to any suitable trigger.

Figure 15:
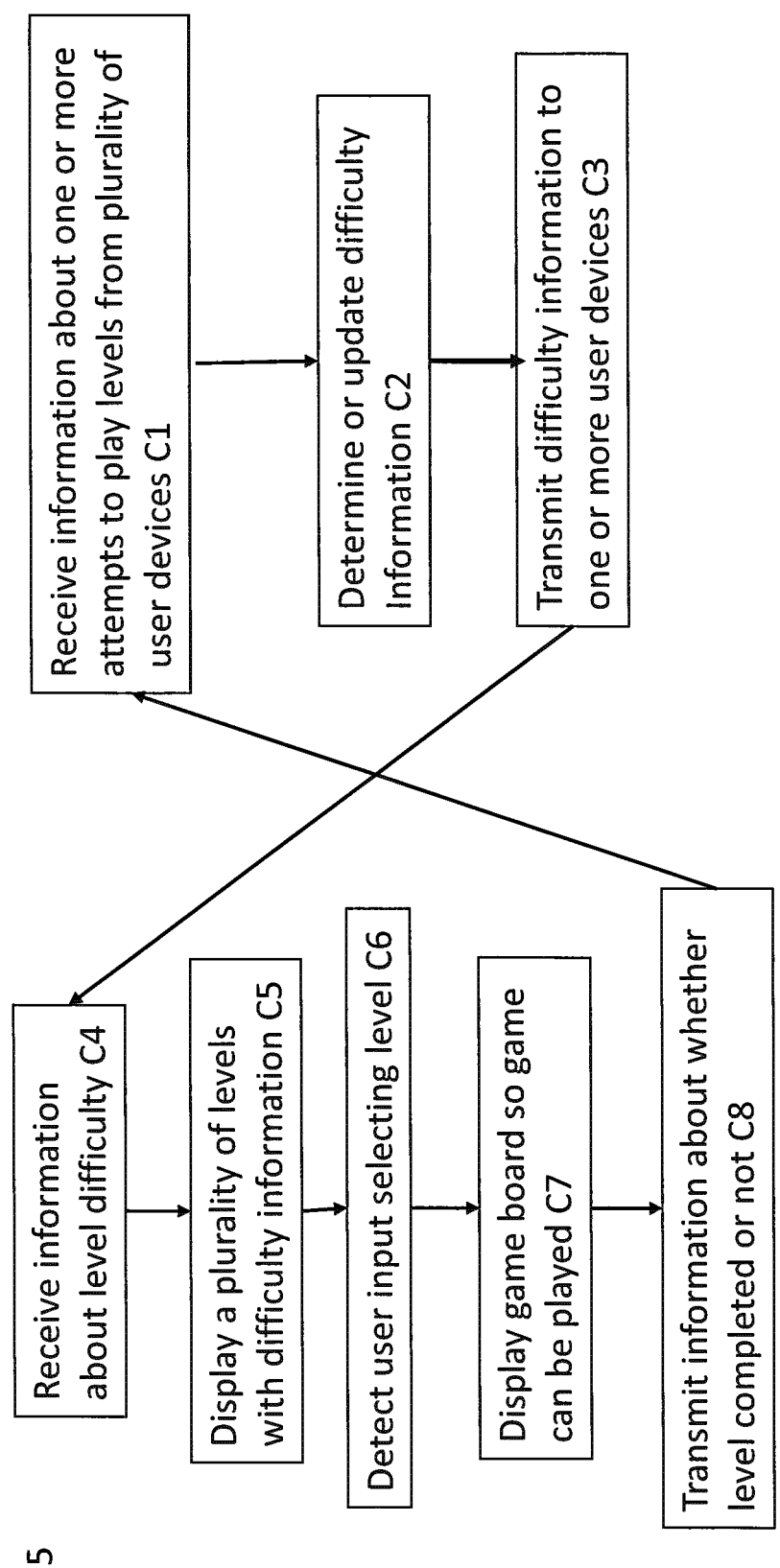
FIG. 15 shows a flowchart according to another embodiment.

Reference is made to FIG. 15 which shows the example embodiment discussed previously where the determination as to whether a level is hard or not is performed in the server.

In step C1, the server thus receives information about one or more attempts to play one or more levels from one or more user devices. This may provide information has to whether an attempt to play a particular level has been successful or not.

In step C2, the server determines or updates difficulty information in dependence on the received information. This may be as discussed previously.

In step C3, the server transmits the updated or determined difficulty information to one or more user devices as previously described. For example, this information may comprise information indicating which level is hard or any of the other difficulty information previously discussed. This information may be sent when a change in difficulty occurs or using any other criteria.

In step C4, the user device receives the information about level difficulty from the server.

In step C5, the user device displays a plurality of level options with difficulty information for one or more these displayed levels. This may be as described previously.

In step C6, the user device receives input from the user via the user interface to select a level. The user device thus detects input selecting a particular level.

In step C7, the game board is displayed and the selected level can be played as discussed previously.

In step C8, the user device transmits information about whether the level is completed or not to server. The server uses this information in step C1. The user device sends this information each time a level is played or less frequently.

When a user of device goes off-line, the user is able to continue to play the game. However, synchronizing information needs to be sent back to the server such as count information on the different levels, scores associated with the levels; and/or any other suitable information.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer device providing a computer implemented game, said computer device comprising:
   a display;
   at least one processor configured to control the display to display a plurality of different user selectable options for the computer implemented game, each of the plurality of different user selectable options being associated with a respective one of a plurality of levels of the computer implemented game, each level of the plurality of levels being associated with a difficulty, the difficulty of a level being dependent on an average number of attempts taken by a plurality of players to complete the respective level, the at least one processor being configured to cause the display to display a difficulty indication next to one or more of the user selectable options for one or more levels of the plurality of levels requiring a highest number of average attempts;
   a user interface configured to detect user input from a player of said computer implemented game selecting one of the user selectable options;
   said at least one processor configured in response to the detected user input to cause the display to display the level of the game associated with the option selected by the detected user input;
   said at least one processor being configured to determine if the player has completed the selected level and if so to determine a number of attempts taken by the player to complete the selected level;
   a transmitter configured to transmit information about the determined number of attempts taken to complete a respective level by said player; and
   a receiver configured to receive updated difficulty information for at least one level of the plurality of levels to provide an updated difficulty indication for that respective level.

2. The computer device as claimed in claim 1, wherein said difficulty indication comprises information indicating that a respective level is in a given difficulty category.

3. The computer device as claimed in claim 2, wherein said given difficulty category comprises at least one level satisfying at least one threshold.

4. The computer device as claimed in claim 3, wherein said at least one threshold comprises at least a minimum average number of attempts to complete a respective level by said plurality of players.

5. The computer device as claimed in claim 3, comprising adjusting said at least one threshold such that a number of levels in the given difficulty category is less than a defined amount.

6. The computer device as claimed in claim 2, wherein said given difficulty category comprises N levels, wherein said N levels have the highest average number of attempts to complete a level and N is an integer.

7. The computer device as claimed in claim 2, wherein said given difficulty category comprises a hard category.

8. The computer device as claimed in claim 1, wherein said at least one processor is configured in response to selection via said user interface of one of said plurality of different user selectable level options to cause a game board of the associated level of the computer implemented game to be displayed.

9. The computer device as claimed in claim 1, said difficulty indication comprises information indicating that a respective level is in a given difficulty category and said respective difficulty indication is displayed only if said level is in said given difficulty category.

10. A computer implemented game server, said computer implemented game comprising a plurality of different levels, said server comprising:
a receiver configured to receive, from a plurality of different computer devices on which said computer implemented game is played by a group of players, information associated with one or more attempts to play a plurality of levels of said computer implemented game, said information indicating for a given player the number of attempts taken to complete a respective level;
at least one processor configured to use said received information to determine a difficulty associated with at least one level of said plurality of levels, said difficulty being dependent on an average number of attempts taken by said group of players to complete said respective level; and
transmitting difficulty information relating to the difficulty of at least one level of the plurality of levels to one or more of said plurality of different computer devices, the difficulty information being dependent on the average number of attempts taken by the group of players to complete the respective level.

11. The computer implemented game server as claimed in claim 10, wherein the at least one processor is configured to update a difficulty associated with one or more levels in response to receiving from one or more of said plurality of computer devices, further information about a number of attempts taken to complete a respective level by a respective player and said transmitter is configured to transmit updated difficulty information for at least one level of the plurality of levels to one or more of said plurality of different computer devices.

12. A computer implemented method providing a computer implemented game comprising:
controlling a display of a computer device, by at least one processor of the computer device, to display a plurality of different user selectable options for the computer implemented game, each of the plurality of different user selectable options being associated with a respective one of a plurality of levels of the computer implemented game, each level of the plurality of levels being associated with a difficulty, the difficulty of a level being dependent on an average number of attempts taken by a plurality of players to complete the respective level, and to display a difficulty indication next to one or more of the user selectable options for one or more levels of the plurality of levels requiring a highest number of average attempts;
detecting by a user interface of the computer input user input from a player of said computer implemented game selecting one of the user selectable options;
responsive to the detected user input causing, by the at least one processor, the display to display the level of the game associated with the option selected by the detected user input;
determining by the at least one processor if the player has completed the selected level and if so, determining a number of attempts taken by the player to complete the selected level;
transmitting by a transmitter of the computer device information about the number of attempts taken to complete a respective level by said player; and
receiving by a receiver of the computer device updated difficulty information for at least one level of the plurality of levels, to provide an updated difficulty indication for that respective level.

13. The computer method as claimed in claim 12, wherein said difficulty information comprises information indicating that a respective level is in a given difficulty category, said given difficulty category comprises at least one level satisfying at least one threshold, said method comprising adjusting by said at least one processor at least one threshold such that a number of levels in the given category is less than a defined amount.

14. A computer implemented method comprising:
receiving by a receiver of a computer implemented game server, from a plurality of different computer devices on which a computer implemented game is played by a group of players, information associated with one or more attempts to play a plurality of levels of said computer implemented game, said information indicating for a given player the number of attempts taken to complete a respective level;
using by at least one processor said received information to determine a difficulty associated with at least one level of said plurality of levels, said difficulty being dependent on an average number of attempts made by said group of players to complete said respective level; and
transmitting by a transmitter of the computer implemented game server, difficulty information for at least one level of the plurality of levels to one or more of said plurality of different computer devices, the difficulty information being dependent on the average number of attempts taken by the group of players to complete the respective level.

15. A non-transitory computer readable storage device storing instructions that, when executed by at least one processor of a computer device causes said at least one processor to perform the following steps:

controlling a display of the computer device to display a plurality of different user selectable options for the computer implemented game, each of the plurality of different user selectable options being associated with a respective one of a plurality of levels of the computer implemented game, each level of the plurality of levels being associated with a difficulty, the difficulty of a level being dependent on an average number of attempts taken by a plurality of players to complete the respective level, and to display a difficulty indication next to one or more of the user selectable options for one or more levels of the plurality of levels requiring a highest number of average attempts;

responsive to user input via a user interface of the computer device selecting one of the user selectable options, causing the display to display the level of the computer implemented game associated with the option selected by the user input;

determine if the player has completed the selected level and if so, determining a number of attempts taken by the player to complete the selected level;

transmit information about the number of attempts taken to complete a respective level by said player; and receive updated difficulty information for at least one level of the plurality of levels to provide an updated difficulty indication for that respective level.

16. A non-transitory computer readable storage device storing instructions that, when executed by at least one processor of a server causes said at least one processor to perform the following steps:

receive, from a plurality of different computer devices on which a computer implemented game is played by a group of players, information associated with one or more attempts to play a plurality of levels of said computer implemented game, said information indicating for a given player the number of attempts taken to complete a respective level;

use said received information to determine a difficulty associated with at least one level of said plurality of levels, said difficulty being dependent on am average number of attempts taken by said group of players to complete said respective level; and transmit difficulty information for at least one level of the plurality of levels to one or more of said plurality of different computer devices, the difficulty information being dependent on the average number of attempts taken by the group of players to complete the respective level.

\* \* \* \* \*